Jan. 15, 1957   J. J. SHIVELY   2,777,898
REPRODUCING APPARATUS
Original Filed Aug. 1, 1951   5 Sheets-Sheet 1

INVENTOR.
John J. Shively
BY
Van Deusen & Shively
ATTORNEYS.

Jan. 15, 1957   J. J. SHIVELY   2,777,898
REPRODUCING APPARATUS
Original Filed Aug. 1, 1951   5 Sheets-Sheet 2

INVENTOR.
John J. Shively
BY
Van Deventer & Shively
ATTORNEYS.

Jan. 15, 1957 J. J. SHIVELY 2,777,898
REPRODUCING APPARATUS
Original Filed Aug. 1, 1951 5 Sheets-Sheet 3

INVENTOR.
John J. Shively
BY
Van Deventer & Shively
ATTORNEYS.

Jan. 15, 1957  J. J. SHIVELY  2,777,898
REPRODUCING APPARATUS
Original Filed Aug. 1, 1951  5 Sheets-Sheet 4

INVENTOR.
John J. Shively
BY
Van Deventer & Shively
ATTORNEYS.

United States Patent Office 2,777,898
Patented Jan. 15, 1957

2,777,898
REPRODUCING APPARATUS

John J. Shively, New York, N. Y., assignor to Telephone Answering and Recording Corporation, New York, N. Y., a corporation of Delaware Original application August 1, 1951, Serial No. 239,773. Divided and this application December 8, 1954, Serial No. 473,940

2 Claims. (Cl. 179—6)

The present invention pertains to improvements in reproducing apparatus, and the instant application is a division of co-pending application Serial No. 239,773, filed August 1, 1951.

An object of the invention is to provide improved means for automatic control of reproducer heads on telephone answering machines, phonographs and the like.

A further object is to provide apparatus of the above nature adapted to accurate repetitive playing of disc or cylinder recordings of varying lengths without the use of lead-in or lead-out grooves.

Another object is to provide means of the above type adapted to bring the reproducer head into engagement with the record at low speed, whereby bounce and injury to the head or record are avoided.

A further object is to provide accurately controlled feed of the reproducer needle into the first groove of the recording, irrespective of the exact location of the groove with respect to the point at which the needle engages the record.

Another object is to provide smooth and prompt disengagement of the head from the record and return of the former to initial position, irrespective of the length of the recording.

Another object is to provide apparatus of the above type which is well adapted to accurate and reliable operation with fine-line or shallow grooved recordings.

Another object is the provision of apparatus of the above type which is operable by remote control.

Other objects and advantages of the invention will become evident during the course of the following description in connection with the accompanying drawings, in which.

Figure 2:
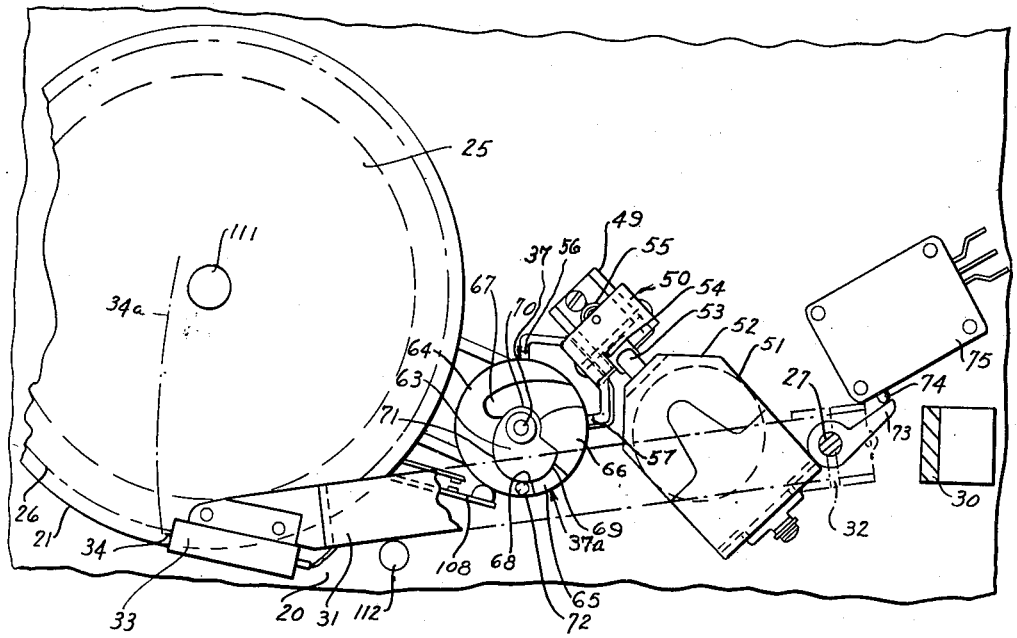
Figure 2 is a plan view of the same with the reproducer arm partly cut away to disclose the parts below it.
Figure 1:
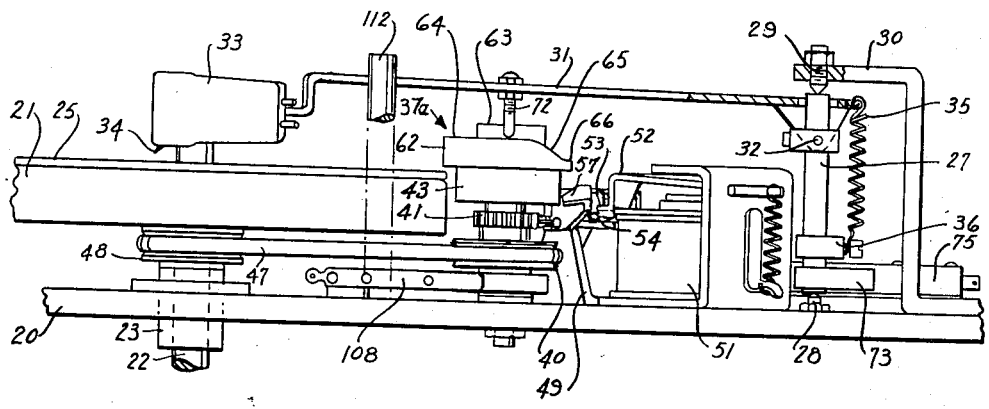
Figure 1 is a side view of a preferred form of the invention with the parts in normal position.

Referring to Figures 1 and 2, the numeral 20 designates a supporting plate for a preferred form of the invention. A turntable 21 has a shaft 22 journalled in a vertical bearing member 23 and adapted to be driven in any suitable manner by a motor 24, shown diagrammatically in Figure 12. The turntable 21 is adapted to carry a record disc 25 having thereon a spiral groove sound recording 26, Figure 2.

A vertical spindle 27 is pivoted on lower and upper needle-points 28 and 29, these pivots being mounted respectively in the plate 20 and a bracket 30. An arm 31 is horizontally hinged at 32 to the spindle 27 and carries on its outer end a reproducer cartridge or pick-up head 33 having a needle 34 adapted to engage the recording 26. A light tension spring 35, Figure 1, connecting the rear end of the arm 31 with a vertically adjustable member 36 on the spindle 27, serves to counter-balance a portion of the weight of the arm and pick-up head, so that the needle 34 may engage the record with properly regulated pressure. It will be obvious that if desired a suitable counter-weight may be substituted for the spring 35.

Figure 5:
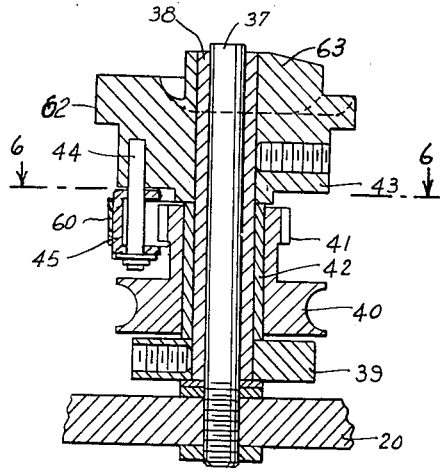
Figure 5 is an enlarged vertical sectional view of the cam-turret assembly.

The numeral 37 designates a stationary vertical spindle carrying a control turret assembly 37a shown in sectional detail in Figure 5. Referring to the latter figure it will be noted that the spindle 37 is secured to the plate 20 and carries a rotatable sleeve 38. A cam 39 is secured on the lower end of the sleeve 38. A grooved pulley 40, carrying a ratchet 41, has an internal bushing 42 rotatably mounted on the sleeve 38 above the cam 39. A hub 43, forming part of a compound cam combination hereinafter described in detail, is secured to the sleeve 38 above the ratchet 41.

Figure 8:
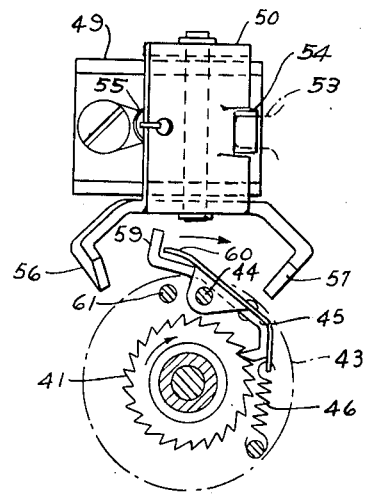
Figure 8 is a view similar to Figure 6 but showing the clutch pawl in engaged position to cause initial rotation of the cam turret.

A vertical pin 44, fixed in the hub 43, carries a pawl 45 adapted to engage the ratchet 41 as shown in Figure 8. Referring to the latter figure, it will be seen that a spring 46 urges the pawl 45 into engagement with the ratchet 41. The pulley 40, as shown in Figure 1, is connected via a belt 47 with a driving pulley 48 on the turntable shaft 22. Thus whenever the turntable is in operation the pulley 40 and ratchet are rotated, and if the pawl 45 is engaged as shown in Figure 8, the hub 43 is also rotated.

A bracket 49, Figures 1, 2, 7 and 8, secured to the plate 20 adjacent the turret assembly 37a, has pivoted horizontally thereon a rocker 50 adapted to be controlled by an electro-magnet 51, Figures 1 and 2. The magnet 51 has an armature 52 terminating in a foot 53 engaging a projection 54 on the rocker 50, this projection being held upward against the foot 53 by action of a tension spring 55.

The rocker 50 has two claws or detents 56 and 57 directed radially toward the axis of the turret assembly 38 at approximately 90 degrees from each other. These detents are so disposed that when the magnet 51 is de-energized the detent 56 lies in the plane of rotation 58 of the pawl 45, as shown in full lines in Figure 7, while when the magnet is energized the detent 57 is moved into the plane 58 while the detent 56 is rocked upward out of the plane, as shown in dot-and-dash lines, Figure 7.

Figure 9:
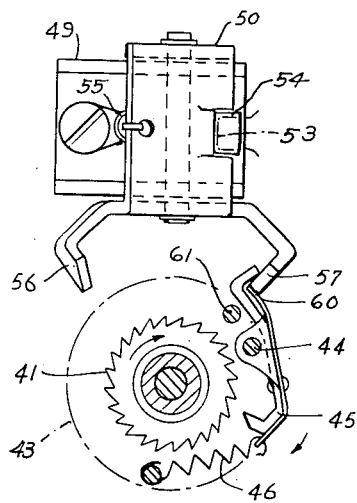
Figure 9 is a similar view showing the clutch pawl disengaged in intermediate stop position.

Referring to Figure 8, it will be noted that the rear end of the pawl 45 is formed as an outwardly-directed hook 59, in front of which is a light curved leaf spring 60. In operation, when the pawl 45, engaged and rotating as shown in Figure 8, encounters the detent 57, the detent first slightly depresses the spring 60, then encounters the hook 59. Continued motion of the pin 44 causes the pressure on the hook 59 to rock the pawl 45 out of engagement with the ratchet 41. As the disengagement of the pawl from the ratchet releases the frictional load on the pawl, the leaf spring 60 acts to force the pawl farther out of engagement, thus providing complete de-clutching without any possibility of drag. A stop pin 61 prevents any possibility of the pawl travelling so far as to be accidentally released from the detent 57. At the same time the curved end of the spring 60 presses outward against the detent 57 in such a manner as to prevent any tendency toward rebound. It will thus be seen that by the means described the compound cam hub 43 is stopped and held in pre-determined position as shown in Figure 9, while the ratchet 41 continues to revolve.

Figure 6:
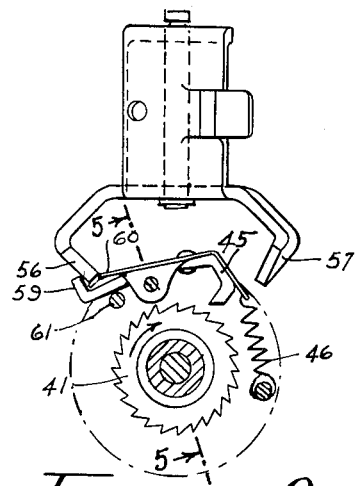
Figure 6 is a horizontal sectional view of the same in the plane 6—6, Figure 5, together with the trip detent rocker showing the apparatus in normal position.
Figure 7:
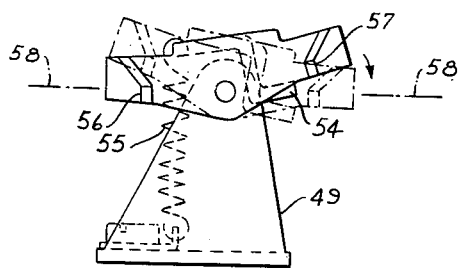
Figure 7 is a detail front view of the trip rocker.

Similarly, when de-energization of the magnet 51 allows the detent 57 to be swung upward by the spring 55, thus clearing the pawl 45, the latter again engages the ratchet 41 and is rotated thereby until it is again released and stopped by the detent 56 in the predetermined position shown in Figure 6, the latter being the normal stop position of the device. Similarly, energization of the magnet 51 causes the detent 56 to move upwardly clear of the pawl, which latter again engages the ratchet 41 and is moved toward the aligned detent 57 as shown in Figure 9.

From the foregoing it will be evident that, starting in normal position as shown in Figure 6, energization of the magnet 51 causes the upper compound cam group and the lower cam 39 to be revolved approximately one-quarter of a revolution, and as soon as the magnet is de-energized the cams complete the remaining three-quarter revolution to initial position.

The compound cam comprises an upwardly directed face cam 62 surmounted by an edge cam 63. The face cam 62 has an upper level 64 from which a lowering slope 65 leads to a lower level 66, from which latter a scoop-shaped elevating slope 67 leads upward again to the upper level. The edge cam 63, Figures 2 and 4, has a short outer circumferential surface portion 68 disposed in registry with the beginning of the lowering slope 65. This circumferential portion blends into a gradually inwardly curving guide surface 69 from which the surface leads sharply inward to an inner circumferential portion 70 in registry with the lower face level 66 and the elevating slope 67. From this point a return surface 71 spirals outward to the circumferential portion 68.

The arm 31 has secured therein a pin 72 adapted to ride on the face cam 62, this pin being of such length that when it rests on the upper level 64 the reproducer needle 34 is held out of contact with the record 25, as shown in Figure 1. The arm spindle 27 carries near its lower end a small arm 73 engaging the spring-pressed plunger 74 of a switch 75. The switch 75 exerts light pressure on the arm 73, being preferably of the well-known snap action type commonly used in coin-operated machines.

Figure 12:
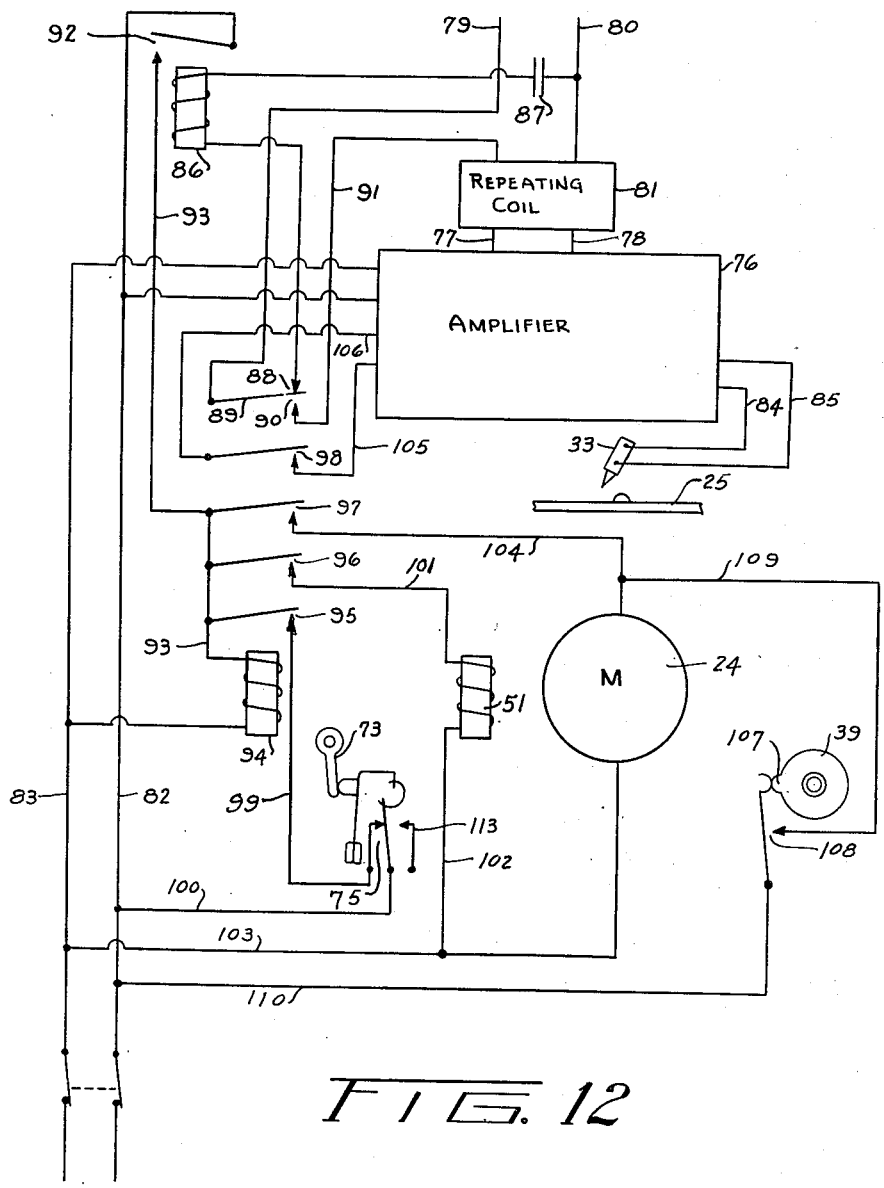
Figure 12 shows a typical control circuit for the device.

Figure 12 shows a typical circuit arrangement for the device, illustrating its application to straight telephone answering. It will be understood, however, that the use of the invention is not confined to such service, as it may be used in various other combinations such as the combined telephone answering and recording machine disclosed in co-pending application Serial Number 133,506, filed on December 12, 1949.

Referring to Figure 12, thet numeral 76 designates an amplifier of any suitable type, having output conductors 77 and 78 adapted to be connected to telephone line conductors 79 and 80, preferably through a repeating coil or isolation transformer 81 and switching means hereinafter described. Current supply for the amplifier, for example 110 volts A. C., is furnished through conductors 82 and 83, while input to the amplifier is derived via wires 84 and 85 from the pick-up 33.

A ringing relay 86 has its coil connected across the telephone line 79—80 via a series condenser 87 and the normally closed side 88 of a double-throw relay contact 89. The normally open side 90 of the contact 89 is connected by a lead 91 to the repeating coil 81. A normally open contact 92 on the relay 86 is adapted when closed to complete a circuit from the supply conductor 82 through a branch 93 to the coil of a second relay 94, thence to the second supply conductor 83, the relay 94 including the double-throw contact 89. The normally closed side 88 of the contact 89 is adjusted to open only after the other hereinafter described contacts of the relay 94 have closed.

In addition to the double-throw contact 89 previously mentioned, the relay 94 has four normally open contacts 95, 96, 97 and 98. The first three contacts 95, 96 and 97 are connected on one side to the supply branch 93. The other side of the contract 95 is connected via a wire 99 to the snap switch 75 which in turn is connected through a wire 100 to the supply conductor 82. The second contact 96 is adapted to close a circuit via wires 101, 102 and 103 through the coil of the trip magnet 51 to the second supply conductor 83, while the third contact 97 is adapted to close a similar circuit via wires 104 and 103 through the motor 24. The fourth contact 98 of the relay 90 is provided to control the plate circuit of the amplifier 76 via conductors 105 and 106.

The lower turret cam 39 has a peripheral lobe 107 which normally holds a switch 108 in open position. One side of the switch 108 is connected through a branch 109 to the motor lead 104, while the other side of the switch is connected via a wire 110 to the supply conductor 82. It will be evident that once the cam 39 has revolved sufficiently to allow the switch 108 to close, a holding circuit is established through the motor 24 which keeps the latter in operation until the cam 39 again reaches normal position.

A typical operation of the device is as follows, starting from normal condition as shown in Figures 1, 2 and 12, and assuming the record 25 to carry a recording 21 comprising an answering message:

When ringing current is impressed on the telephone line 79—80, the ringing relay 86 is energized, closing the contact 92 to energize the second relay 94 and throw all its described contacts. The contact 89 cuts out the ringing relay 86 with its condenser 87 and connects the line 79 to the repeating coil 81, the line 80 being already solidly connected thereto as shown. The relay contact 98 closes the plate circuit of the amplifier 76. The contact 95 closes a holding circuit through the closed switch 75 to the branch conductor 93, causing the relay 94 to remain locked in when the ringing relay contact 92 opens.

Closure of the contact 97 energizes the motor 24, causing it to drive the turntable 21 and with the latter the turret pulley 40 and ratchet 41 via the belt 47. At the same time closure of the contact 96 energizes the trip magnet 51, tripping the turret clutch in the manner previously described to cause rotation of the turret cams one-quarter revolution to the intermediate stop position shown in Figures 3 and 4.

Figure 3:
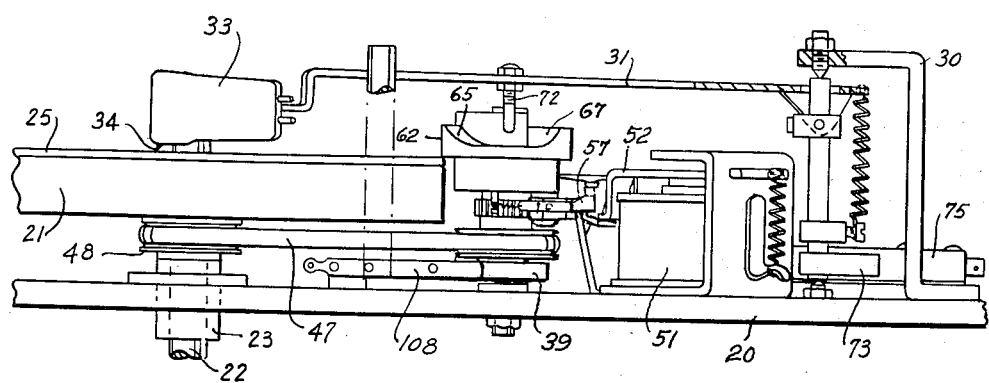
Figure 3 is a view similar to Figure 1 but with the parts in actuated position.
Figure 10:
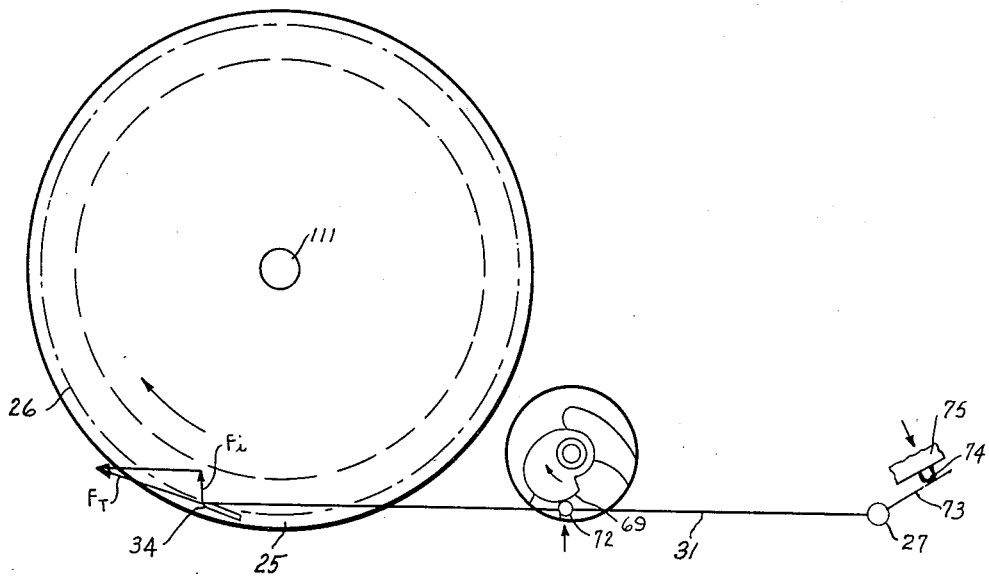
Figure 10 illustrates diagrammatically the manner in which the upper cam controls the feed of the needle into the first groove.

As the face cam 68 revolves as noted, the arm pin 72 rides down the lowering slope 65, lowering the needle 34 gently on the record 25 as shown in Figure 3, the pin 72 thereafter hanging clear of the lower cam level 66. The cam 63 so locates the arm that the needle initially engages the record in the blank zone outside the recording 26. Thereafter the needle is automatically fed into the first groove of the recording in the following manner:

Referring to Figure 2, it will be seen that the arm spindle 27 is so spaced from the turntable 21 that the path of swing 34a of the needle 34 passes beyond the center 111 of the turntable. The result of this arrangement and proportioning of the parts is best illustrated in diagrammatic Figure 10, wherein it is shown that the center line of the arm 31 from the pivot 27 to the needle 34 is directed outwardly from the tangent at the point of contact of the needle. As a result the tangential frictional force $F_t$ exerted by the record on the needle has an inward component $F_i$ which, augmented by the urge of the follow-up switch plunger 74, swings the arm inward until the needle engages the recording 26.

It will be seen that the above-described action causes automatic engagement of the needle with the recording irrespective of the precise location of the latter, and without the use of a lead-in groove. However, if the described inward swing of the arm 31 and head 33 were to be allowed to take place unrestrained, the swing-in may occur with sufficient speed and momentum to cause the needle 34 to skip one or more grooves of the recording 26, especially in the case of very shallow or fine line recordings. In the present invention this improper action is prevented by the upper turret cam 63, which permits only slow inward feeding motion under restraint of the pin 72 by the cam surface 69, the inward curve of the latter determining the speed of feed. Thus the needle 34 is fed into the first groove of the recording 26 slowly and under complete control of the cam 63, insuring proper registry without possibility of skipping.

Figure 4:
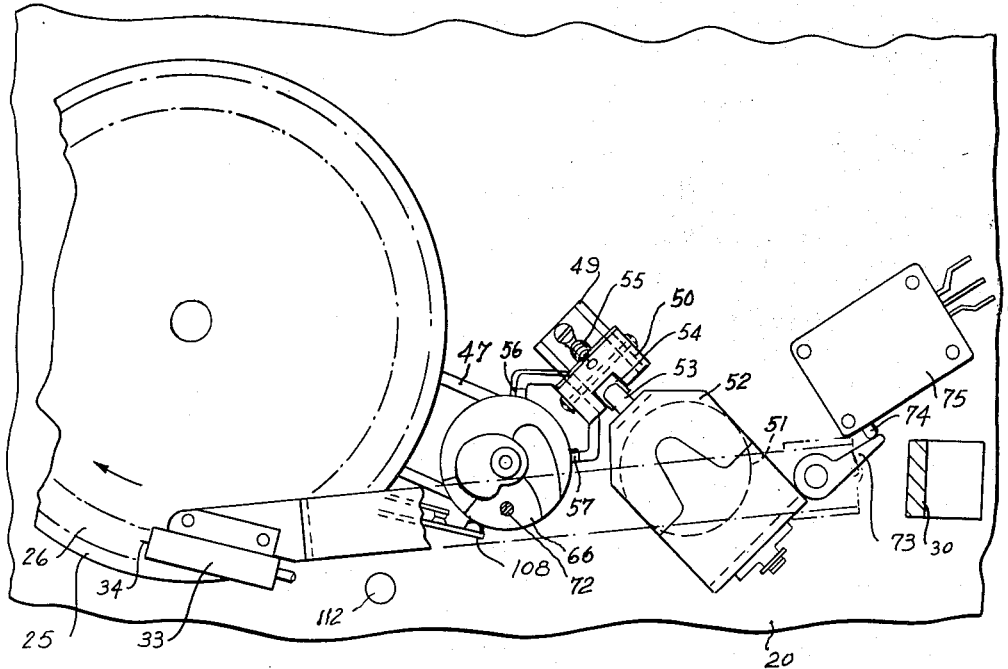
Figure 4 is a plan view corresponding to Figure 3.

When the needle 34 has engaged the recording groove as noted, the latter takes over the guiding function from the cam surface 69, which moves clear of the pin 72 into the position shown in Figures 3 and 4. Thereafter the reproducer 33 traverses the recording 26 freely in the usual manner as illustrated in Figure 4, thus causing the recorded message to be sent out over the telephone line 79—80 via the amplifier 76 and related connections as previously described.

When the recording 26 has been traversed and the needle 34 runs out of the last groove thereof, the inward frictional component $F_1$ and the pressure of the switch plunger 74 cause the arm 31 to swing rapidly inward, unrestrained by the cams, until the snap switch 75 is allowed to open. This opening breaks the previously described holding circuit of the relay 94, causing the latter to drop out. Thereby the telephone line 79 is disconnected from the repeater coil 81 and reconnected to the ringing relay 86, the amplifier plate circuit is opened, and the trip magnet 51 is de-energized. Since the turret cam 39 has previously been revolved one-quarter revolution, as previously noted, the motor 24 is kept in operation by the holding circuit through the switch 108.

Figure 11:
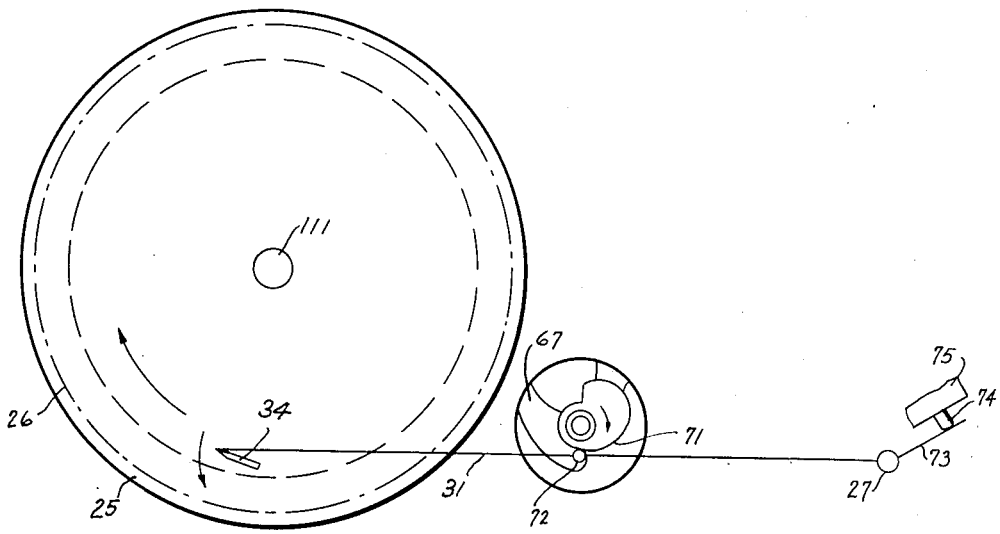
Figure 11 illustrates the return of the reproducer to initial position by the upper cam.

Release of the trip magnet 51 causes the turret assembly 38 to complete the remaining three-quarters of a revolution in the manner previously described. The elevating slope 67 of the face cam 62 first engages the arm pin 72 to raise the pick-up 33 from the record 25, after which the return surface 71 of cam 63 engages the side of the pin as shown in Figure 11 and moves the arm assembly outward, returning the parts to normal stop position as shown in Figures 1 and 2. As the turret assembly 38 nears normal position the lobe 107 of cam 39 opens the switch 108, breaking the holding circuit to the motor 24 and allowing the latter to coast to a stop.

It will be noted that due to the gradual curves and comparatively slow speed of the arm control cams 62 and 63, all movements of the arm 31 thereby take place smoothly, easily and without shock. To prevent any accidental displacement of the reproducer arm from proper start position, for example after changing records, a stop post 112 is provided which effectively defines the outermost arm position.

As the arm 31 is returned to normal position by the cam 63 as described, the small arm 73 throws the snap switch 75 to closed position as shown in Figure 12, but no current passes therethrough, since the contact 95 of relay 94 has previously opened. The switch 75 may be provided with a second throw contact 113 usable when the device is employed in conjunction with other combinations as previously mentioned; for example, the contact 113 may be used to initiate the recording cycle of a combination answering and recording device such as that shown in the aforementioned co-pending application Serial Number 133,506.

It has been pointed out that the device eliminates the use of lead-in or lead-out grooves in automatic record playing. In automatic telephone answering as given as example herein, it is customary to start the actual message in the second groove of the recording, so that the cam-controlled feed of the needle into the first groove prevents the possibility of any portion of the message being lost. It will be evident also that the exact location of the recording zone with respect to initial needle contact position is not at all critical, and that any length of recording within the operating range of the follow-up switch 75 may be used without adjustment. In some cases it may be desired to so proportion the parts that the inward frictional urge of the record on the needle is dispensed with, in which case all inward urge is supplied by the switch 75.

With an automatic answering device, it is important that in case the current supply should fail while the machine is in operation, the telephone line be not left in "off the hook" condition. This is accomplished in the present invention by the drop-out of relay 94 in case of current failure, the contact 89 cutting out the repeating coil 81 and restoring the telephone line to normal or "on the hook" condition as shown in Figure 12.

In case current has failed, for example while the device is midway through an answering cycle, when the current is restored no purpose would be served by completing the interrupted message. Instead, restoration of current merely starts the motor 24 through the cam switch 108, and as the trip magnet 51 is deenergized, the turret cams 62 and 63 immediately restore the arm 31 to normal position as shown in Figure 1, the motor 24 then being deenergized by opening of the cam switch 108. Thus it will be seen that whenever current failure may have interrupted a message, restoration of current causes immediate restoration of the device to normal condition, ready to answer the next call.

For different applications different arrangements and proportions of control cams may be desirable, and similarly a complete cyclic rotation of the turret assembly may be divided into any two fractional revolutions desired. For example, such a cyclic rotation may comprise two movements of one-half revolution each instead of the one-quarter and three-quarter revolution combination illustrated herein, by providing the detents 56 and 57 at 180 degrees from each other instead of 90 degrees as shown. In other words, while the invention has been set forth in preferred form, it is not limited to the exact structures illustrated, as various modifications and changes may be made without departing from the scope of the appended claims.

What is claimed is:

1. In a telephone answering device adapted to be operatively associated with a telephone line, in combination, a movable member having thereon a medium carrying a message recording, reproducing means cooperative with said movable member and having a normal stop position adjacent the beginning of said message recording, means operable by an electric current to drive said movable member in said cooperative relation with said reproducing means and to operatively connect said reproducing means to said telephone line, whereby said answering message may be transmitted to said associated telephone line, said normally connecting means being rendered operative by interruption of said electric current during said transmission to disconnect said telephone line from said reproducing means, and means operable immediately by restoration of said current to re-set said reproducing means to said normal stop position irrespective of the portion of said transmission wherein said interruption has occurred.

2. The combination claimed in claim 1 wherein said connecting means includes a relay having a contact adapted to complete a self-holding circuit for said current through the coil thereof when said relay is energized and a second contact adapted to hold said reproducer operatively connected to said line while said relay is energized, and including means operable by ringing current on said telephone line to initially energize said relay.

References Cited in the file of this patent

UNITED STATES PATENTS

| | | |
|---|---|---|
| 2,336,777 | Clausen | Dec. 14, 1943 |
| 2,375,525 | Clausen | May 8, 1945 |
| 2,542,192 | Handschin | Feb. 20, 1951 |
| 2,553,410 | Handschin | May 15, 1951 |